United States Patent
Ai et al.

(10) Patent No.: US 10,560,637 B2
(45) Date of Patent: Feb. 11, 2020

(54) IMAGE PROCESSING SYSTEM, REMOTELY CONTROLLED SHOOTING ASSEMBLY AND EXPOSURE INFORMATION PROMPT METHOD

(71) Applicant: SZ DJI TECHNOLOGY CO., LTD., Shenzhen (CN)

(72) Inventors: Chuyue Ai, Shenzhen (CN); Weifeng Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/621,855

(22) Filed: Jun. 13, 2017

(65) Prior Publication Data
US 2017/0280038 A1    Sep. 28, 2017

Related U.S. Application Data

(63) Continuation of application No. PCT/CN2014/093891, filed on Dec. 15, 2014.

(51) Int. Cl.
*H04N 5/235* (2006.01)
*H04N 5/232* (2006.01)
(Continued)

(52) U.S. Cl.
CPC ......... *H04N 5/2353* (2013.01); *G06T 7/0002* (2013.01); *H04N 5/23203* (2013.01); *H04N 5/23245* (2013.01); *B64C 2201/141* (2013.01)

(58) Field of Classification Search
CPC ............. H04N 5/2353; H04N 5/23203; H04N 5/2351; H04N 5/23245; H04N 5/235;
(Continued)

(56) References Cited

U.S. PATENT DOCUMENTS

| 5,164,836 A | * | 11/1992 | Jackson | ............. | H04N 5/23293 348/364 |
| 7,683,958 B1 | * | 3/2010 | Chen | .................. | H04N 5/23293 348/333.01 |

(Continued)

FOREIGN PATENT DOCUMENTS

| CN | 101272482 A | 9/2008 |
| CN | 101404728 A | 4/2009 |

(Continued)

OTHER PUBLICATIONS

The World Intellectual Property Organization (WIPO) International Search Report for PCT/CN2014/093891 dated Aug. 21, 2015 5 Pages.

*Primary Examiner* — Albert H Cutler
(74) *Attorney, Agent, or Firm* — Anova Law Group, PLLC

(57) ABSTRACT

An image processing system includes an image receiving unit configured to receive a picture sent by a remote shooting apparatus, an image analysis unit configured to analyze the picture to obtain exposure situations of respective parts in the picture, an exposure evaluation unit configured to evaluate exposure conditions of the respective parts in the picture based on the exposure situations of the respective parts in the picture to determine whether the respective parts in the picture are overexposed and determine overexposed parts, and an exposure information prompt unit configured to prompt an evaluation result in accordance with evaluation of the exposure evaluation unit.

14 Claims, 4 Drawing Sheets

(51) Int. Cl.
*G06T 7/00* (2017.01)
*B64C 39/02* (2006.01)
*G06T 7/80* (2017.01)

(58) Field of Classification Search
CPC ... G06T 7/0002; G06T 7/80; B64C 2201/127; B64C 2201/146; B64C 2201/141; B64C 39/024
See application file for complete search history.

(56) References Cited

U.S. PATENT DOCUMENTS

| | | | | |
|---|---|---|---|---|
| 7,697,025 | B2* | 4/2010 | Hasegawa | H04N 5/23216 |
| | | | | 348/135 |
| 8,237,817 | B2* | 8/2012 | Nakatani | G03B 17/20 |
| | | | | 345/440 |
| 2004/0189860 | A1 | 9/2004 | Senba | |
| 2005/0275737 | A1* | 12/2005 | Cheng | H04N 5/23293 |
| | | | | 348/333.02 |
| 2009/0002495 | A1* | 1/2009 | Jacumet | H04N 5/222 |
| | | | | 348/187 |
| 2011/0037865 | A1* | 2/2011 | Takagi | H04N 5/232 |
| | | | | 348/211.9 |
| 2015/0036013 | A1* | 2/2015 | Matsuno | H04N 5/23203 |
| | | | | 348/211.9 |
| 2015/0248584 | A1* | 9/2015 | Greveson | G06K 9/00476 |
| | | | | 382/113 |
| 2015/0355103 | A1* | 12/2015 | Ando | G01N 21/8851 |
| | | | | 348/46 |

FOREIGN PATENT DOCUMENTS

| | | |
|---|---|---|
| CN | 101513039 A | 8/2009 |
| CN | 101651785 A | 2/2010 |
| CN | 101778205 A | 7/2010 |
| CN | 201667682 U | 12/2010 |
| CN | 102262330 A | 11/2011 |
| CN | 103108130 A | 5/2013 |
| JP | 2002542730 A | 12/2002 |
| JP | 2003270698 A | 9/2003 |
| JP | 2006115249 A | 4/2006 |
| JP | 2007067874 A | 3/2007 |
| JP | 2010114600 A | 5/2010 |
| JP | 2010202178 A | 9/2010 |
| JP | 2012186698 A | 9/2012 |
| JP | 2013013064 A | 1/2013 |

* cited by examiner

IMAGE PROCESSING SYSTEM, REMOTELY CONTROLLED SHOOTING ASSEMBLY AND EXPOSURE INFORMATION PROMPT METHOD

CROSS-REFERENCE TO RELATED APPLICATION

This is a continuation application of International Application No. PCT/CN2014/093891, filed on Dec. 15, 2014, the entire contents of which are incorporated herein by reference.

TECHNICAL FIELD

The present disclosure relates to the field of remotely controlled shooting, and in particular, to an image processing system, a remotely controlled shooting assembly, a mobile terminal and an exposure information prompt method.

BACKGROUND

With development of science and technology, remotely controlled shooting technologies have been widely used in military or civilian and other fields, for example, travel photography, monitoring, search and rescue, environmental surveillance and so on.

The existing remotely controlled shooting assembly generally uses a mobile terminal to control a remote shooting apparatus to shoot a picture. The remote shooting apparatus includes an image capturing element, and the image capturing element is used for acquiring an image of a scene/object to be shot. The remote shooting apparatus transmits the image acquired by the image capturing element to the mobile terminal. Through the mobile terminal, a user can observe the scene/object to be shot. However, the user cannot observe an exposure condition of the image through the mobile terminal, and if an underexposure or overexposure situation occurs, the quality of the shot image will be affected.

SUMMARY OF THE DISCLOSURE

In view of this, the present disclosure provides a remotely controlled shooting terminal that enables timely and convenient observation of image exposure conditions, a remotely controlled shooting assembly having the remotely controlled shooting terminal and an exposure information prompt method.

An image processing system, includes:
an image receiving unit used for receiving a shot picture sent by an imaging device;
an image analysis unit used for analyzing the shot picture received by the image receiving unit, to obtain exposure situations of respective parts in the shot picture;
an exposure evaluation unit used for evaluating exposure conditions of the respective parts in the video/image picture in accordance with the exposure situations of the respective parts in the shot picture obtained by the analysis unit, to determine whether or not the respective parts in the shot picture are overexposed and determine overexposed parts; and
an exposure information prompt unit used for prompting an evaluation result in accordance with evaluation of the exposure evaluation unit.

Further, the imaging device is disposed on a mobile platform.

Further, the mobile platform is an unmanned aerial vehicle, and the imaging device is disposed on the unmanned aerial vehicle through a gimbal.

Further, the image processing system further includes a shooting parameter acquisition unit and a shooting parameter setting unit;
the shooting parameter acquisition unit is used for acquiring shooting parameters of the remote shooting apparatus; and
the shooting parameter setting unit obtains by calculation shooting parameters in a suitable degree of exposure in accordance with the shooting parameters obtained by the shooting parameter acquisition unit and the evaluation result of the exposure evaluation unit.

Further, the shooting parameter setting unit corrects shooting parameters corresponding to the shot picture in accordance with an evaluation result for an exposure condition of the shot picture, to obtain a reset shooting parameter.

Further, the shooting parameter setting unit transmits set shooting parameters to a display screen of a mobile terminal, and the display screen displays the set shooting parameters to a user.

Further, the shooting parameters include at least one of an aperture size, a shutter speed and an ISO film speed.

Further, the image processing system further includes a command generation unit and a sending unit;
the command generation unit generates a corresponding control command in accordance with the shooting parameters set by the shooting parameter setting unit; and
the sending unit is used for transmitting the control command generated by the command generation unit to the imaging device.

Further, the control command only includes the shooting parameters set by the shooting parameter setting unit;
or the control command is a command, which is generated in accordance with the shooting parameters, of controlling the remote shooting apparatus to shoot a picture in accordance with the shooting parameters set by the shooting parameter setting unit.

A remotely controlled shooting assembly, includes a remote shooting apparatus and a mobile terminal with a display screen. The mobile terminal is used for receiving and displaying a shot picture returned by the remote shooting apparatus, and the mobile terminal includes a main controller used for controlling the remote shooting apparatus to shoot a picture. The main controller is further used for analyzing the received shot picture, to obtain exposure situations of respective parts in the shot picture;
and evaluates exposure conditions of the respective parts in the video/image picture in accordance with the exposure situations of the respective parts in the shot picture obtained, to determine whether or not the respective parts in the shot picture are overexposed and determine overexposed parts;
and is used for prompting the overexposed part in the shot picture to a user in accordance with an evaluation result of the exposure evaluation unit.

Further, the main controller further evaluates underexposure situations of the shot picture.

Further, the main controller is further used for acquiring shooting parameters of the remote shooting apparatus; and, in accordance with the shooting parameters obtained and the evaluation result of the exposure evaluation unit, obtaining by calculation shooting parameters that make a picture displayed by the display screen obtain a suitable degree of exposure.

Further, the main controller corrects shooting parameters corresponding to the shot picture in accordance with an evaluation result for an exposure condition of the shot picture, to obtain reset shooting parameters.

Further, the main controller transmits set shooting parameters to the display screen of the mobile terminal, and the display screen displays the set shooting parameters to the user.

Further, the shooting parameters include at least one of an aperture size, a shutter speed and an ISO film speed.

Further, the mobile terminal is further used for generating a corresponding control command in accordance with the set shooting parameters; and used for transmitting the generated control command to the remote shooting apparatus.

Further, the control command only includes the shooting parameters set by the main controller;

or the control command is a command, which is generated in accordance with the shooting parameter, of controlling the remote shooting apparatus to shoot a picture in accordance with the shooting parameters set by the shooting parameter setting unit.

Further, the exposure information prompt unit marks overexposed parts in a picture displayed in the display screen.

Further, overexposed parts in a picture displayed in the display screen are marked with a pattern similar to a zebra crossing;

or, the overexposed parts in the picture displayed in the display screen are highlighted in a blinking manner;

or, the overexposed parts in the picture displayed in the display screen are displayed in a particular color.

An exposure information prompt method, including the following steps:

receiving a shot picture returned by an imaging device;

displaying the received shot picture;

analyzing a received image/video, to obtain exposure situations of respective parts in the shot picture;

evaluating exposure conditions of the respective parts in the video/image picture in accordance with the exposure situations of the respective parts in the shot picture obtained by the analysis unit, to determine whether or not the respective parts in the shot picture are overexposed; and highlighting overexposed parts in the shot picture if an overexposure situation exists in the shot picture.

Further, the overexposed parts are marked with a pattern of a zebra crossing;

or the overexposed parts are highlighted in a blinking manner;

or the overexposed parts are displayed in a particular color.

Further, shooting is performed by using current shooting parameters if an overexposure situation does not exist in the shot picture.

Further, shooting parameters of a current shot picture are acquired.

Further, the shooting parameters include at least one of an aperture size, a shutter speed and an ISO film speed.

Further, shooting parameters that make a picture obtain a suitable degree of exposure is obtained by calculation in accordance with the shooting parameter obtained and an evaluation result for the shot picture.

Further, shooting parameters corresponding to the shot picture are corrected in accordance with an evaluation result for an exposure condition of the shot picture, to obtain reset shooting parameters.

Further, a corresponding control command is generated in accordance with the shooting parameters obtained by calculation.

Further, the control command only includes the shooting parameters obtained by calculation;

or the control command is a command, which is generated in accordance with the shooting parameters, of controlling a remote shooting apparatus to shoot a picture in accordance with the shooting parameters obtained by calculation.

Further, the exposure conditions of the respective parts in the video/image picture are evaluated in accordance with exposure situations of the respective parts in the shot picture obtained by the analysis unit, to determine whether or not the respective parts of the shot picture are underexposed, and if underexposure does not exist, shooting is performed in accordance with current shooting parameters.

A mobile terminal, is used for controlling a remote shooting apparatus to shoot a picture, receiving and displaying a shot picture returned by the remote shooting apparatus. The mobile terminal includes a main controller used for analyzing the received shot picture and obtaining exposure situations of respective parts in the shot picture; and evaluating exposure conditions of the respective parts in video/image picture in accordance with the exposure situations of the respective parts in the shot picture obtained, to determine whether or not the respective parts of the shot picture are overexposed and determine an overexposed part; and used for prompting the overexposed part in the shot picture to a user in accordance with an evaluation result of the exposure evaluation unit.

Further, the main controller is further used for acquiring shooting parameters of the remote shooting apparatus, and obtaining by calculation shooting parameters in a suitable degree of exposure in accordance with the shooting parameters obtained by the shooting parameter acquisition unit and the evaluation result of the exposure evaluation unit.

Further, the main controller corrects shooting parameters corresponding to the shot picture in accordance with an evaluation result for an exposure condition of the shot picture, to obtain reset shooting parameters.

Further, the main controller transmits set shooting parameters to a display screen of a mobile terminal, and the display screen displays the set shooting parameters to the user.

Further, the shooting parameters include at least one of an aperture size, a shutter speed and an ISO film speed.

Further, the main controller is further used for generating a corresponding control command in accordance with shooting parameters set by the shooting parameter setting unit, and transmitting the control command generated by the command generation unit to the imaging device.

Further, the control command only includes the shooting parameters set by the shooting parameter setting unit;

or the control command is a command, which is generated in accordance with the shooting parameters, of controlling the remote shooting apparatus to shoot a picture in accordance with the shooting parameter set by the shooting parameters setting unit.

With respect to the prior art, the image processing system, the remotely controlled shooting assembly, the mobile terminal and the exposure information prompt method, by displaying, in the mobile terminal, an overexposed part in an image/video picture returned by a remote shooting apparatus, can thus rapidly and conveniently understand, in real time, an exposure situation of the image/video picture shot by the remote shooting apparatus, so as to shoot an image/video in line with user requirements.

DESCRIPTION OF MAIN REFERENCE NUMERALS

TABLE 1

| | |
|---|---|
| Remotely controlled shooting assembly | 100 |
| Mobile terminal | 10 |
| Display screen | 11 |
| First receiver/sender | 13 |
| Image processing system | 12 |
| Receiving unit | 121 |
| Image analysis unit | 122 |
| Exposure evaluation unit | 123 |
| Exposure information prompt unit | 124 |
| Shooting parameter acquisition unit | 125 |
| Shooting parameter setting unit | 126 |
| Command generation unit | 127 |
| Sending unit | 128 |
| Display unit | 129 |
| Remote shooting apparatus | 20 |
| Carrier | 21 |
| Second receiver/sender | 211 |
| Image capturing element | 22 |

Embodiments of the present disclosure are further described below in combination with the accompanying drawings.

DETAILED DESCRIPTION OF THE EMBODIMENTS

Figure 1:
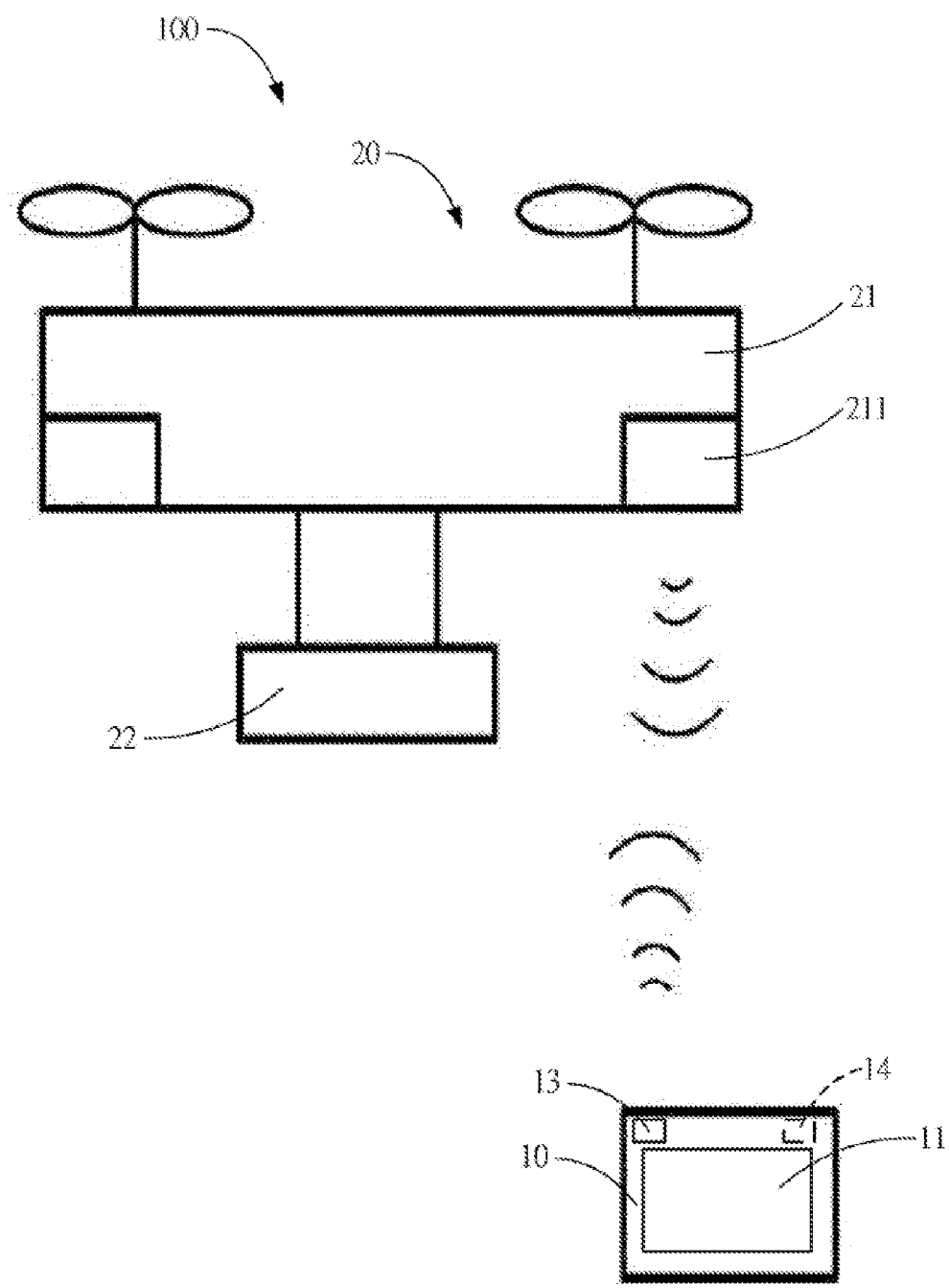
FIG. 1 is a schematic view of a remotely controlled shooting assembly according to an embodiment of the present disclosure.

Referring to FIG. 1, a remotely controlled shooting assembly 100 according to an embodiment of the present disclosure includes a mobile terminal 10 and a remote shooting apparatus 20. The mobile terminal 10 controls the remote shooting apparatus 20 to shoot a picture. The remote shooting apparatus 20 transmits a shot image/video and a shooting parameter to the mobile terminal 10.

In some embodiments, the mobile terminal 10 further controls movement of the remote shooting apparatus 20, to make the remote shooting apparatus 20 shoot a picture in different environments, occasions and/or positions.

The mobile terminal 10 is an electronic device having a display screen 11, and the display screen 11 may be used for displaying an image/video returned by the remote shooting apparatus 20. Specifically, the mobile terminal 10 may be a mobile phone, a tablet computer, a notebook computer, a desktop computer or the like.

The mobile terminal 10 includes a first receiver/sender 13 used for receiving the image/video and the shooting parameter from the remote shooting apparatus 20.

Figure 2:
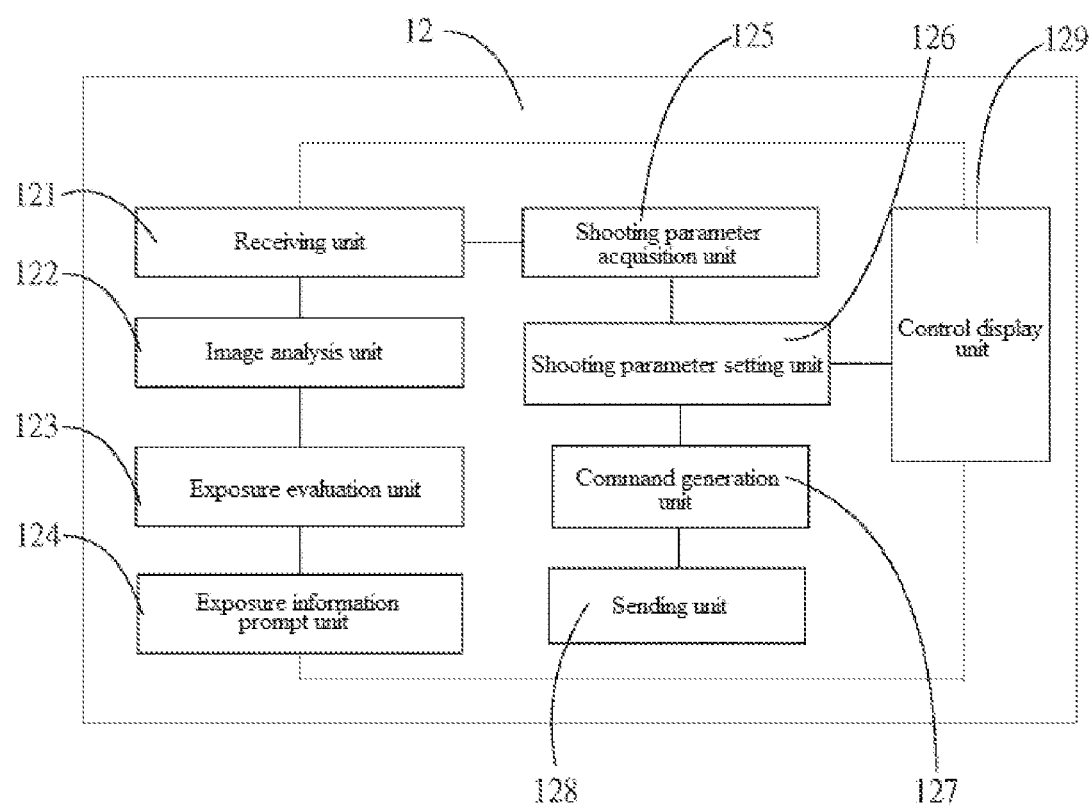
FIG. 2 is a schematic view of an image processing system according to an embodiment of the present disclosure.

Referring to FIG. 2 together, the mobile terminal 10 may process the received image/video by using an image processing system 12. The image processing system 12 includes a receiving unit 121, an image analysis unit 122, an exposure evaluation unit 123, an exposure information prompt unit 124, a shooting parameter acquisition unit 125, a shooting parameter setting unit 126, a command generation unit 127, a sending unit 128 and a display unit 129.

The receiving unit 121 is used for receiving the image/video and the shooting parameter returned by the remote shooting apparatus 20. The receiving unit 121 may receive the image/video and the shooting parameters returned by the remote shooting apparatus 20 in a wired and/or wireless manner.

The image analysis unit 122 is used for analyzing the image/video received by the receiving unit 121, to obtain exposure situations of respective parts in the image/video picture.

The exposure evaluation unit 123 is used for evaluating exposure conditions of the respective parts in the video/image picture in accordance with the exposure situations of the respective parts in the video/image picture obtained by the image analysis unit 122, to determine whether or not the respective parts in the video/image picture are overexposed and determine overexposed parts. In addition, in other embodiments, the exposure evaluation unit 123 further evaluates an underexposure situation of the video/image picture.

The exposure information prompt unit 124 is used for prompting the overexposed part in the image/video picture to the user in accordance with an evaluation result of the exposure evaluation unit 123. Specifically, the exposure information prompt unit 124 marks an overexposed part in the picture displayed in the display screen 11. In the embodiment, the overexposed parts in the picture displayed in the display screen 11 are marked with a pattern similar to a zebra crossing. Optionally, the overexposed parts in the picture displayed in the display screen 11 are highlighted in a blinking manner, or the overexposed parts in the picture displayed in the display screen 11 are displayed in a particular color.

The shooting parameter acquisition unit 125 is used for acquiring the shooting parameters of the remote shooting apparatus 20, and the shooting parameters include, but is not limited to, an aperture size, a shutter speed and an ISO film speed.

The shooting parameter setting unit 126 obtains by calculation shooting parameters that make the picture displayed by the display screen 11 obtain a suitable degree of exposure in accordance with the shooting parameters obtained by the shooting parameter acquisition unit 125 and the evaluation result of the exposure evaluation unit 123. In the embodiment, the shooting parameter setting unit 126 at least sets one parameter in an aperture size, a shutter speed and an ISO film speed.

Specifically, the shooting parameter setting unit 126 corrects shooting parameters corresponding to the image/video picture in accordance with an evaluation result for an exposure condition of the image/video picture, to obtain reset shooting parameters. For example, if the image/video picture is overexposed, the shutter speed is increased, the aperture is decreased and/or the ISO film speed is reduced appropriately; if the image/video picture is underexposed, the shutter speed is decreased, the aperture is increased and/or the ISO film speed is increased appropriately.

Shooting parameters set by the shooting parameter setting unit 126 can be transmitted to the display unit 129, and the display unit 129 displays the set shooting parameters to a user, so that the user can manually operate the remote shooting apparatus 20 to shoot a picture in accordance with the shooting parameters.

The command generation unit 127 is used for generating a corresponding control command in accordance with the shooting parameters set by the shooting parameter setting unit 126. The control command may only include the shooting parameters set by the shooting parameter setting unit 126, and may also be a command, which is generated in accordance with the shooting parameters, of controlling the remote shooting apparatus 20 to shoot a picture in accordance with the shooting parameters set by the shooting parameter setting unit 126. When the control command only includes the shooting parameters set by the shooting parameter setting unit 126, the remote shooting apparatus 20 may, in accordance with the shooting parameters set by the shooting parameter setting unit 126, shoot a picture on its own according to the shooting parameters.

The sending unit 128 is used for transmitting the control command generated by the command generation unit 127 to the remote shooting apparatus 20. The sending unit 128 may transmit the control command to the remote shooting apparatus 20 in a wired and/or wireless manner. It can be understood that the functions of the sending unit 128 and the receiving unit 121 can be implemented by the first receiver/sender 13. In addition, the command of controlling the remote shooting apparatus 20 to move is also sent to the remote shooting apparatus 20 through the sending unit 128.

The display unit 129 is used for displaying the image/video received by the mobile terminal 10 to a user, displaying an overexposed part in the image/video picture to the user, and displaying the shooting parameter of the image/video picture and the reset shooting parameter to the user. It can be understood that the function of the display unit 129 can be implemented by the display screen 11.

The remote shooting apparatus 20 includes a carrier 21 and an image capturing element 22 disposed on the carrier 21.

The carrier 21 is used for carrying the image capturing element 22. Specifically, the carrier 21 may be stationary and may also be moving. For example, the stationary carrier 21 may be a structure (for example, a street sign, a billboard, an upright post, a cross bar, a wall and so on) or a natural object (for example, a big tree, hillstone and so on); the moving carrier 21 may be a vehicle, a ship, an aerial vehicle, a human being or an animal and so on. In the embodiment, the carrier 21 is a movable platform, and specifically, the carrier is an Unmanned Aerial Vehicle (UAV). The UAV may be a rotor aircraft (for example, a helicopter or a rotorcraft), an aerial vehicle having a fixed wing and a rotor, or an aerial vehicle neither having a fixed wing nor having a rotor (for example, a blimp or a hot air balloon).

The carrier 21 includes a second receiver/sender 211, and the second receiver/sender 211 may establish communication with the first receiver/sender 13, to transmit information between the remote shooting apparatus 20 and the mobile terminal 10. In the embodiment, the second receiver/sender 211 has information sending and receiving functions at the same time.

The second receiver/sender 211 and the first receiver/sender 13 can implement mutual communication therebetween in a wired manner such as by using cables or optical fibers, and can also implement mutual communication therebetween in a wireless manner such as by using local area networks, wide area networks, infrared, radio, Wi-Fi, 2G networks, 3G networks, 4G networks, 5G networks, point-to-point (P2P) networks, telecommunication networks or cloud networks. Optionally, in wireless communication, it is possible to use a relay station, for example, a signal tower, a satellite, or a mobile base station or the like. The wireless communication may be short-range or non short-range.

The image capturing element 22 is used for acquiring an image of a scene/object to be shot and transmitting the obtained image/video to the second receiver/sender 211. In the embodiment, the image capturing element 22 transmits the obtained image/video to the second receiver/sender 211 in a real time manner.

In the embodiment, the image capturing element 22 is a digital camera, and specifically, the image capturing element 22 is a CCD (Charge-coupled Device) type or a CMOS (Complementary Metal Oxide Semiconductor) type digital camera.

It can be understood that the second receiver/sender 211 may also be directly integrated onto the image capturing element 22.

Figure 3:
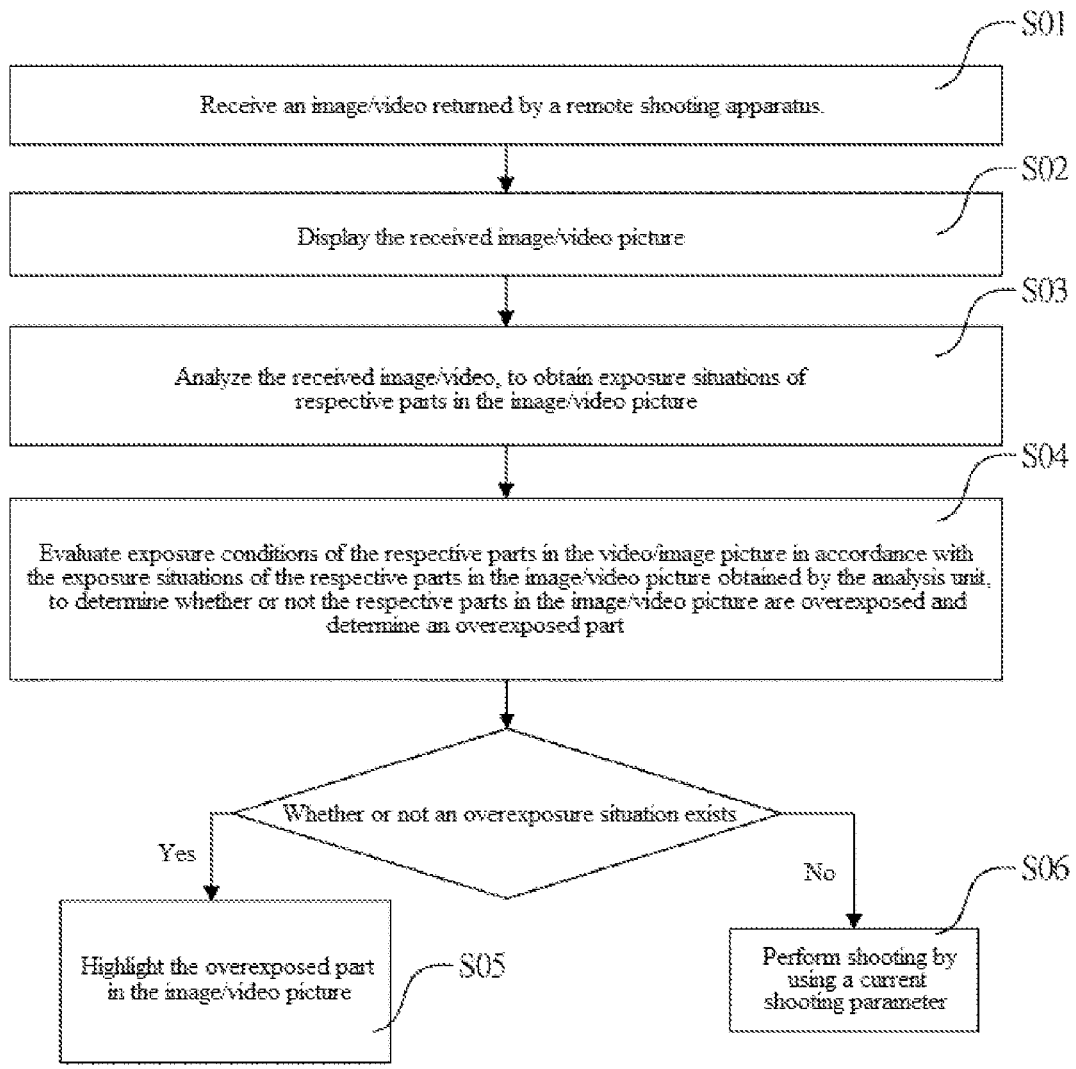
FIG. 3 is a flow chart of an exposure information prompt method according to an embodiment of the present disclosure.

Referring to FIG. 3, it is a flow chart of an exposure information prompt method according to an embodiment of the present disclosure. The exposure information prompt method may be executed by the mobile terminal 10. The exposure information prompt method includes the following steps:

S01, an image/video returned by a remote shooting apparatus is received. This step can be completed in a wired and/or wireless communication manner.

S02, the received image/video picture is displayed.

S03, the received image/video is analyzed, to obtain exposure situations of respective parts in the image/video picture.

S04, exposure conditions of the respective parts in the video/image picture are evaluated in accordance with the exposure situations of the respective parts in the image/video picture obtained by the analysis unit, to determine whether or not the respective parts in the image/video picture are overexposed and determine overexposed parts.

S05, an overexposed part in the image/video picture is highlighted if an overexposure situation exists in the image/video picture. Specifically, the overexposed parts are marked with a pattern similar to a zebra crossing, the overexposed parts are displayed in a blinking manner, or the overexposed parts are displayed in a particular color.

S06, shooting is performed by using current shooting parameters if an overexposure situation does not exist in the image/video picture.

Figure 4:
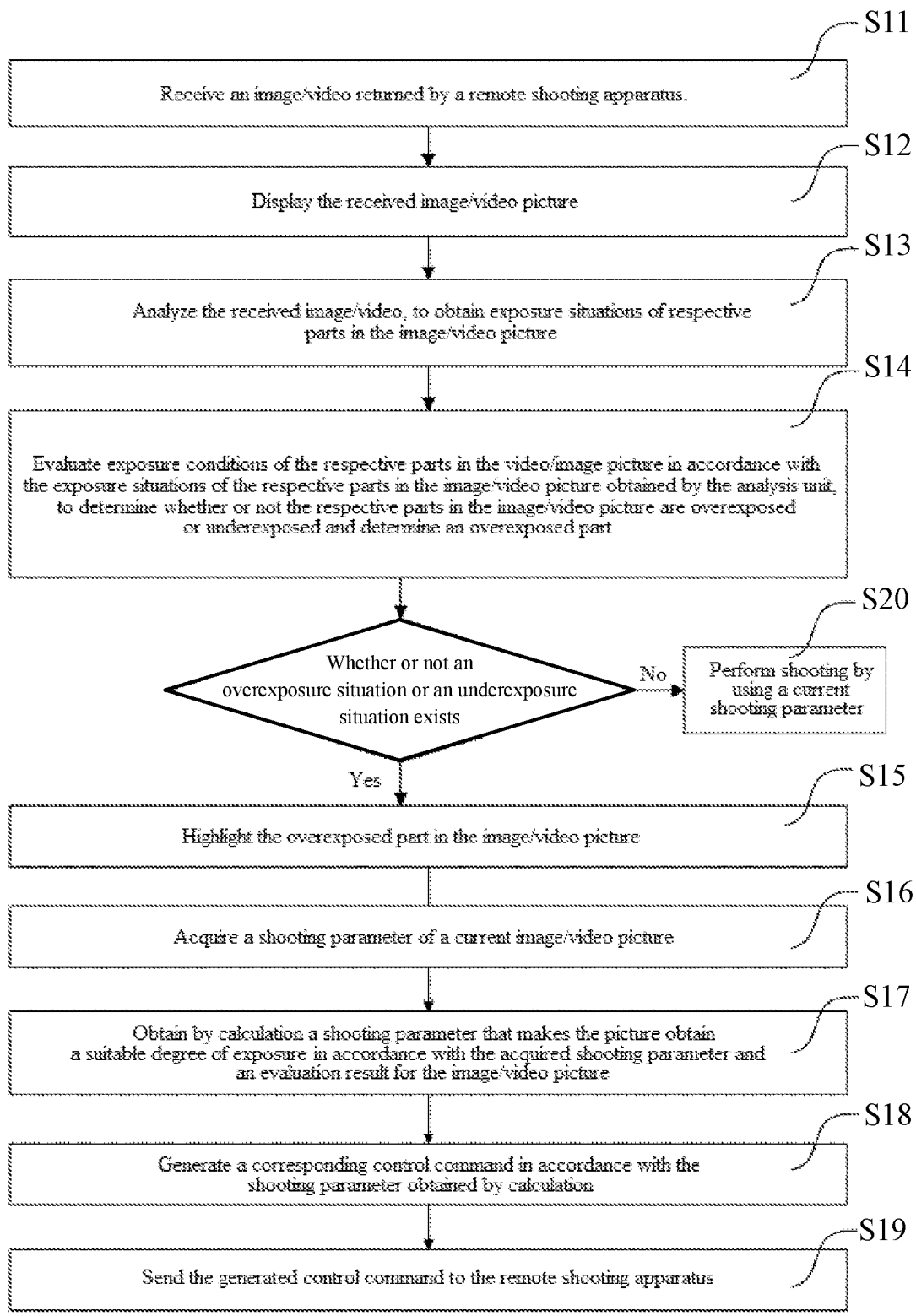
FIG. 4 is a flow chart of an exposure information prompt method according to another embodiment of the present disclosure.

Referring to FIG. 4, it is a flow chart of an exposure information prompt method according to an embodiment of the present disclosure. The exposure information prompt method may be executed by the mobile terminal 10. The exposure information prompt method includes the following steps:

S11, an image/video returned by a remote shooting apparatus is received. This step can be completed in a wired and/or wireless communication manner.

S12, the received image/video picture is displayed.

S13, the received image/video is analyzed, to obtain exposure situations of respective parts in the image/video picture.

S14, exposure conditions of the respective parts in the video/image picture are evaluated in accordance with the exposure situations of the respective parts in the image/video picture obtained by the analysis unit, to determine whether or not the respective parts in the image/video picture are overexposed or underexposed and determine overexposed parts in the image/video picture.

S15, the overexposed part in the image/video picture is highlighted if an overexposure situation exists in the image/video picture. Specifically, the overexposed parts are marked with a pattern similar to a zebra crossing, the overexposed parts are displayed in a blinking manner, or the overexposed parts are displayed in a particular color.

S16, a shooting parameter of a current image/video picture is acquired. The shooting parameter includes, but is not limited to, an aperture size, a shutter speed and an ISO film speed.

S17, a shooting parameter that makes the picture obtain a suitable degree of exposure is obtained by calculation in accordance with the acquired shooting parameter and an evaluation result for the image/video picture. In the implementation, the shooting parameter obtained by calculation at least includes one parameter in an aperture size, a shutter speed and an ISO film speed.

Specifically, it is feasible to correct shooting parameters corresponding to the image/video picture in accordance with an evaluation result for an exposure condition of the image/video picture, to obtain reset shooting parameters. For example, if the image/video picture is overexposed, the shutter speed is increased, the aperture is decreased and/or the ISO film speed is reduced appropriately; if the image/video picture is underexposed, the shutter speed is decreased, the aperture is increased and/or the ISO film speed is increased appropriately.

S18, a corresponding control command is generated in accordance with the shooting parameters obtained by calculation. The control command may only include the shooting parameters obtained by calculation, and may also be a command, which is generated in accordance with the shooting parameters, of controlling the remote shooting apparatus to shoot a picture in accordance with the shooting parameters obtained by calculation. When the control command only includes the shooting parameters obtained by calculation, the remote shooting apparatus may, in accordance with shooting parameters obtained by calculation, shoot a picture on its own according to the shooting parameters.

S19, the generated control command is sent to the remote shooting apparatus. In this step, it is feasible to transmit the control command to the remote shooting apparatus in a wired and/or wireless manner.

S20, if it is judged in step S14 that an overexposure or underexposure situation does not exist in the image/video picture, shooting is performed by using current shooting parameters.

The image processing system, the remotely controlled shooting assembly, the mobile terminal and the exposure information prompt method, by displaying, in the mobile terminal 10, an overexposed part in an image/video picture returned by a remote shooting apparatus, can thus rapidly and conveniently understand, in real time, an exposure situation of the image/video picture shot by the remote shooting apparatus, so as to shoot an image/video in line with user requirements; in addition, the mobile terminal 10 sets shooting parameters in accordance with evaluation for an exposure situation of the image/video picture, which can enhance operational convenience of the system, and is more intelligent and convenient especially for users without shooting experience.

It can be understood that a person skilled in the art can also make other changes and the like to be used in the design of the present disclosure within the spirit of the present disclosure, as long as the changes do not depart from the technical effect of the present disclosure. The changes made in accordance with the spirit of the present disclosure should all be included in the scope of the present disclosure.

What is claimed is:

1. A mobile terminal comprising:
a display screen; and
a controller coupled to the display screen and configured to:
receive a picture sent by a remote shooting apparatus disposed on an unmanned aerial vehicle through a gimbal;
analyze the picture to obtain overall exposure situations of the entire picture;
evaluate, without user input, overall exposure conditions of the entire picture based on the overall exposure situations, to determine whether the picture contains overexposed parts and determine the overexposed parts;
prompt an evaluation result in accordance with evaluation of the overall exposure conditions;
highlight the overexposed parts by at least one of highlighting the overexposed parts in a blinking manner or displaying the overexposed parts in a particular color;
calculate suitable shooting parameters in accordance with at least the evaluation result, the suitable shooting parameters being suitable for the remote shooting apparatus to shoot another picture having an overall degree of exposure suitable for displaying on the display screen;
generate a control command in accordance with the suitable shooting parameters; and
send the control command to the remote shooting apparatus to control the remote shooting apparatus to shoot the another picture.

2. The mobile terminal of claim 1, wherein the controller is further configured to:
acquire shooting parameters of the remote shooting apparatus; and
calculate the suitable shooting parameters in accordance with the shooting parameters and the evaluation result.

3. The mobile terminal of claim 2, wherein the controller is further configured to correct the shooting parameters in accordance with the evaluation result to obtain the suitable shooting parameters.

4. The mobile terminal of claim 2, wherein the display screen is further configured to display the suitable shooting parameters to a user.

5. The mobile terminal of claim 2, wherein the shooting parameters comprise at least one of an aperture size, a shutter speed, or an ISO film speed.

6. The mobile terminal of claim 1, wherein the control command comprises the suitable shooting parameter or includes a command generated in accordance with the suitable shooting parameter for controlling the remote shooting apparatus.

7. An exposure information prompt method, comprising:
receiving, by a mobile terminal, a picture from a remote shooting apparatus disposed on an unmanned aerial vehicle through a gimbal;
displaying the picture on a display screen of the mobile terminal;
analyzing, by the mobile terminal, the picture to obtain overall exposure situations of the entire picture;
evaluating, by the mobile terminal without user input, overall exposure conditions of the entire picture in accordance with the overall exposure situations, to determine whether the picture contains an overexposed part;

highlighting, by the mobile terminal on the display screen, the overexposed part in the picture if an overexposure situation exists in the picture, wherein highlighting the overexposed part includes at least one of highlighting the overexposed part in a blinking manner or displaying the overexposed part in a particular color;

calculating, by the mobile terminal, suitable shooting parameters in accordance with at least an evaluation result of the picture, the suitable shooting parameters being suitable for the remote shooting apparatus to shoot another picture having an overall degree of exposure suitable for displaying on the display screen;

generating, by the mobile terminal, a control command in accordance with the suitable shooting parameters; and sending, by the mobile terminal to the remote shooting apparatus, the control command to control the remote shooting apparatus to shoot the another picture.

8. The exposure information prompt method of claim 7, further comprising:

controlling the remote shooting apparatus to perform picture shooting using current shooting parameters if the overexposure situation does not exist in the picture.

9. The exposure information prompt method of claim 7, further comprising:

acquiring shooting parameters of the picture.

10. The exposure information prompt method of claim 9, wherein the shooting parameters comprise at least one of an aperture size, a shutter speed, or an ISO film speed.

11. The exposure information prompt method of claim 9, wherein calculating the suitable shooting parameters in accordance with at least the evaluation result of the picture includes calculating the suitable shooting parameters in accordance with the acquired shooting parameters and the evaluation result of the picture.

12. The exposure information prompt method of claim 11, wherein calculating the suitable shooting parameters includes correcting the shooting parameters corresponding to the picture in accordance with the evaluation result to obtain the suitable shooting parameters.

13. The exposure information prompt method of claim 7, wherein the control command comprises the suitable shooting parameter or includes a command generated in accordance with the suitable shooting parameter for controlling the remote shooting apparatus.

14. The exposure information prompt method of claim 7, wherein evaluating the overall exposure conditions of the entire picture further includes evaluating the overall exposure conditions to determine whether the picture contains an underexposed part, the method further comprising:

controlling the remote shooting apparatus to perform picture shooting in accordance with current shooting parameters if the picture does not contain the underexposure part.

* * * * *